(12) United States Patent
Loga (10) Patent No.: US 7,063,107 B2
(45) Date of Patent: Jun. 20, 2006

(54) DUAL CHAMBER ORIFICE FITTING BODY

(75) Inventor: Thomas Henry Loga, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 85 days.

(21) Appl. No.: 10/848,883

(22) Filed: May 19, 2004

(65) Prior Publication Data

US 2005/0258389 A1 Nov. 24, 2005

(51) Int. Cl.
*F15D 1/00* (2006.01)

(52) U.S. Cl. .......................... 138/44; 251/205; 251/326
(58) Field of Classification Search .................. 138/40, 138/44, 45; 251/205, 206, 326
See application file for complete search history.

(56) References Cited

U.S. PATENT DOCUMENTS

| | | | |
|---|---|---|---|
| 1,058,092 A | 4/1913 | Pew et al. |
| 1,698,314 A | 1/1929 | Mapelsden |
| 1,996,192 A | 4/1935 | Daniel |
| 2,127,501 A | 8/1938 | Dall |
| 2,217,216 A | 10/1940 | Davis |
| 2,306,940 A | 12/1942 | Fischer |
| 2,407,951 A * | 9/1946 | Daniel .................. | 138/44 |
| 2,626,820 A | 1/1953 | Dons et al. |
| 2,942,465 A | 6/1960 | Carbone |
| 3,381,532 A | 5/1968 | Tausch |
| 3,822,592 A | 7/1974 | Siegel et al. |
| 4,014,366 A * | 3/1977 | Critendon ................ | 138/44 |
| 4,191,216 A | 3/1980 | Connolly |
| 4,307,745 A | 12/1981 | McGee |
| 4,444,224 A | 4/1984 | Geisow |
| 4,478,251 A | 10/1984 | Sanchez et al. |
| 4,633,911 A | 1/1987 | Lohn |
| 4,682,757 A | 7/1987 | Shelton |
| 4,750,370 A | 6/1988 | Ossyra |
| 5,069,252 A | 12/1991 | Kendrick et al. |
| 5,085,250 A | 2/1992 | Kendrick |
| 5,181,542 A | 1/1993 | Wass et al. |
| 5,305,796 A | 4/1994 | Klak |
| 5,318,073 A | 6/1994 | Kendrick et al. |
| 5,474,103 A | 12/1995 | Klak |
| 5,836,356 A | 11/1998 | Desai |
| 5,967,166 A | 10/1999 | Carter |
| 6,164,142 A | 12/2000 | Dimeff |
| 6,324,917 B1 | 12/2001 | Mack et al. |
| 6,467,504 B1 | 10/2002 | Bonicontro |

OTHER PUBLICATIONS

FMC Measurement Solutions; FMC Energy Systems; Bulletin POR0001.00 Issue/Rev. 0.0 (7.01); (10 pp.).

* cited by examiner

*Primary Examiner*—J. Casimer Jacyna
(74) *Attorney, Agent, or Firm*—Conley Rose, P.C.

(57) ABSTRACT

A dual chamber orifice fitting, including a body with a lower chamber in fluid communication with a pipeline and a top with an upper chamber in fluid communication with the lower chamber. A valve assembly closes to hydraulically isolate the upper chamber from the lower chamber and opens to allow an orifice plate carrier to move between the chambers. When the orifice plate carrier is in the lower chamber is can be aligned with the flowbore of the pipeline. The orifice plate carrier can be removed from the fitting through the upper chamber. In the preferred embodiments, at least one of either the upper or lower chambers has a non-rectangular cross-section. The body and top may also have a curved outer surface to accommodate the non-rectangular cross-section of the interior chambers.

26 Claims, 9 Drawing Sheets

DUAL CHAMBER ORIFICE FITTING BODY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to apparatus for monitoring characteristics of a flow stream in a pipeline and in particular to dual chamber orifice fittings. More precisely, embodiments of the invention relate to an improved body design for dual chamber orifice fittings.

In pipeline operations and other industrial applications, flow meters are used to measure the volumetric flow rate of a gaseous or liquid flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of flow stream. The orifice plate is generally a thin plate that includes a circular opening, or orifice, that is typically positioned concentric with the flow stream.

In operation, when the flow stream moving through the piping section reaches the orifice plate, the flow is forced through the orifice, thereby constricting the cross-sectional flow area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting embodies a special design that enables the orifice plate to be removed from the fitting without interrupting the flow stream moving through the piping section. This specially designed fitting has been known in the art for many years. U.S. Pat. No. 1,996,192, hereby incorporated herein by reference for all purposes, was issued in 1934 and describes an early dual chamber orifice fitting. Fittings with substantially the same design are still in use in many industrial applications today. Although the design has remained substantially unchanged, operating conditions continue to expand and dual chamber fittings are now available for piping sizes up to 48-inches in diameter and for working pressures up to 10,000 psi.

Figure 1:
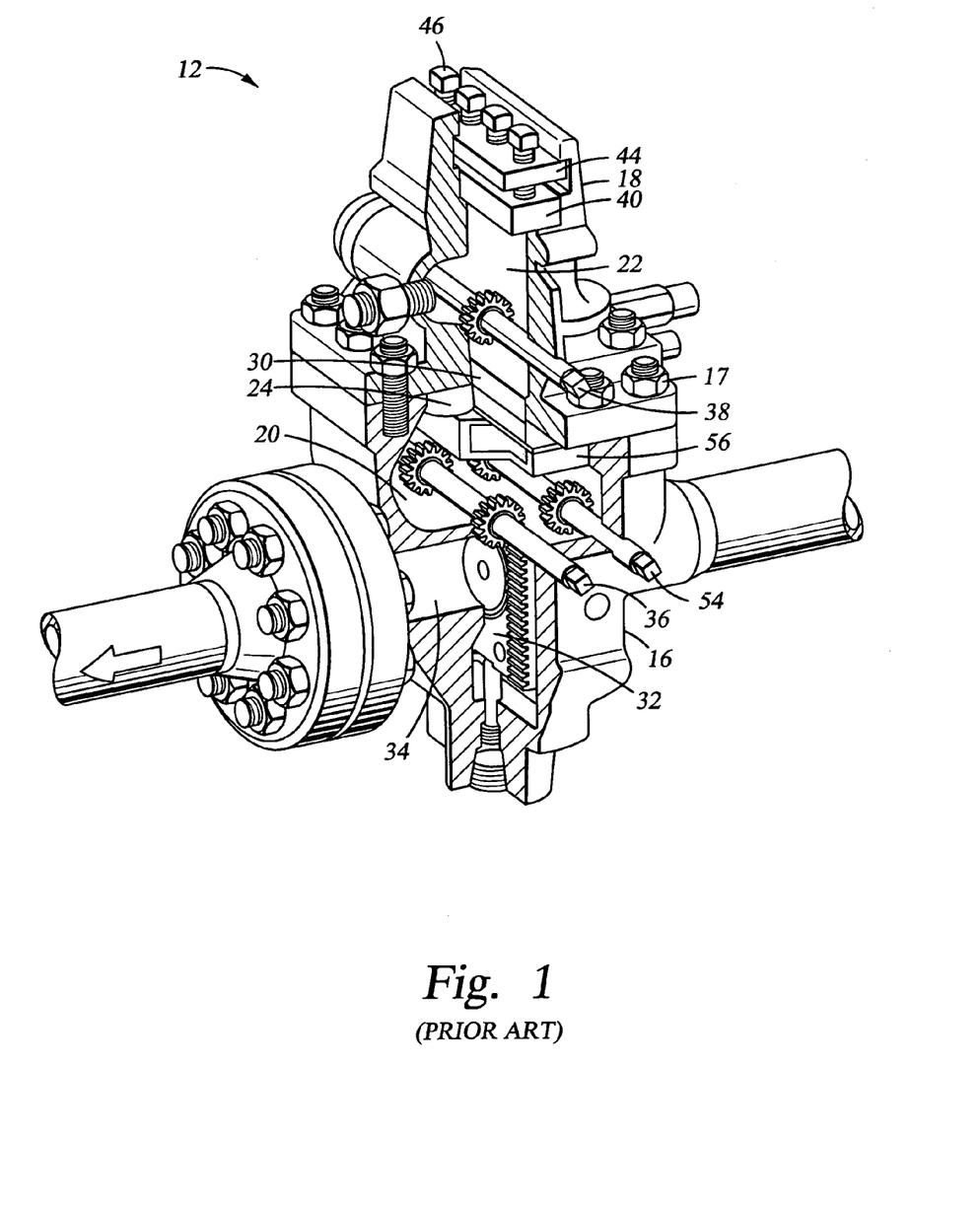
FIG. 1 is a partial sectional isometric view of a prior art dual chamber orifice fitting.

A common dual chamber orifice fitting 12 is illustrated in FIG. 1. Orifice fitting 12 includes body 16 and top 18. Body 16 encloses lower chamber 20 which is in fluid communication with the interior 34 of pipeline. Top 18 encloses upper chamber 22 and is connected to body 16 by bolts 17. Aperture 30 defines an opening connecting upper chamber 22 to lower chamber 20. Valve seat 24 is typically connected to top 18 and provides a sealing engagement with slide valve plate 56, which is slidably actuated by rotating gear shaft 54. Lower drive 36 and upper drive 38 operate to move orifice plate carrier 32 vertically within fitting 12.

Orifice plate carrier 32 is shown in a metering position in alignment with bore 34. To remove orifice plate carrier 32 from fitting 12 the following steps are used. First, gear shaft 54 is rotated to slide valve plate 56 laterally and away from valve seat 24 and open aperture 30. Once aperture 30 is opened, lower drive 36 is actuated to move orifice plate carrier 32 upwards into upper chamber 22. Once orifice plate carrier 32 is entirely within upper chamber 22, aperture 30 is closed to isolate the upper chamber from bore 34 and lower chamber 20. Any pressure within upper chamber 20 can then be relieved and orifice plate carrier 32 can be removed from fitting 12 by loosening clamping bar screws 46 and removing clamping bar 44 and sealing bar 40 from top 18.

Upper chamber 22 and lower chamber 20 are sized so as to accommodate upper drive 38 and lower drive 36 in order to allow orifice plate carrier 32 to move vertically. Lower chamber 20 must also accommodate the horizontal translation of slide valve plate 56. In order to accommodate these components, lower chamber 20 and upper chamber 22 are constructed as generally rectangular cross-sectioned cavities within body 16 and top 18. The general shape of the cavities is commonly formed during the casting process used to make the top or body components. Because of their size and complexity, these castings are often the most expensive components of a dual chamber orifice fitting.

Improvements that decrease the weight of the top and body components or the processing required in producing these components can result in significant savings in the overall cost of producing the fitting. Therefore, the embodiments described herein are directed to apparatus for dual chamber orifice fittings that seek to overcome these and other limitations of the prior art.

SUMMARY OF THE PREFERRED EMBODIMENTS

A dual chamber orifice fitting, comprising a body with a lower chamber in fluid communication with a pipeline and a top with an upper chamber in fluid communication with the lower chamber. A valve assembly closes in order to hydraulically isolate the upper chamber from the lower chamber and opens to allow an orifice plate carrier to move between the chambers. When the orifice plate carrier is in the lower chamber it can be aligned with the flowbore of the pipeline. The orifice plate carrier can be removed from the fitting through the upper chamber. In the preferred embodiments, at least one of either the upper or lower chamber has a non-rectangular cross-section. The body and top may also have a curved outer surface to accommodate the non-rectangular cross-section of the interior chambers.

In one preferred embodiment, a fitting comprises a body portion having a lower chamber in fluid communication with a pipeline and a top portion connected to the body portion and having an upper chamber in fluid communication with the lower chamber. At least a portion of either the upper chamber or the lower chamber has a non-rectangular cross section. The fitting includes a valve adapted to isolate the upper chamber from the lower chamber and a plate having an orifice where the plate has a first position, aligned with the pipeline, where the plate is within the lower chamber and a second position wherein the plate is within the upper chamber.

In certain embodiments, a portion of the upper chamber and/or the lower chamber has an elliptical cross-section. Either the top or body portion may also have a wall with a substantially constant thickness. The fitting may further include an upper flange on the top portion and a lower flange on the bottom portion, wherein the upper and lower flanges have a non-rectangular bolt pattern.

In an alternate embodiment, a dual chamber orifice fitting comprises a body portion having a lower chamber in fluid communication with a pipeline and a top portion having an upper chamber in fluid communication with the lower chamber. At least a portion of either the upper chamber or the lower chamber has a cross-section with a variable interior radius. In some embodiments, the fitting also includes an orifice plate carrier selectably disposable in either the lower chamber or the upper chamber, wherein the orifice plate carrier has a rectangular cross-section. The variable radius cross-section may be elliptical and may be surrounded by a wall of substantially constant thickness.

Thus, the embodiments of present invention comprise a combination of features and advantages that enable substantial enhancement of the operation of dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 2:
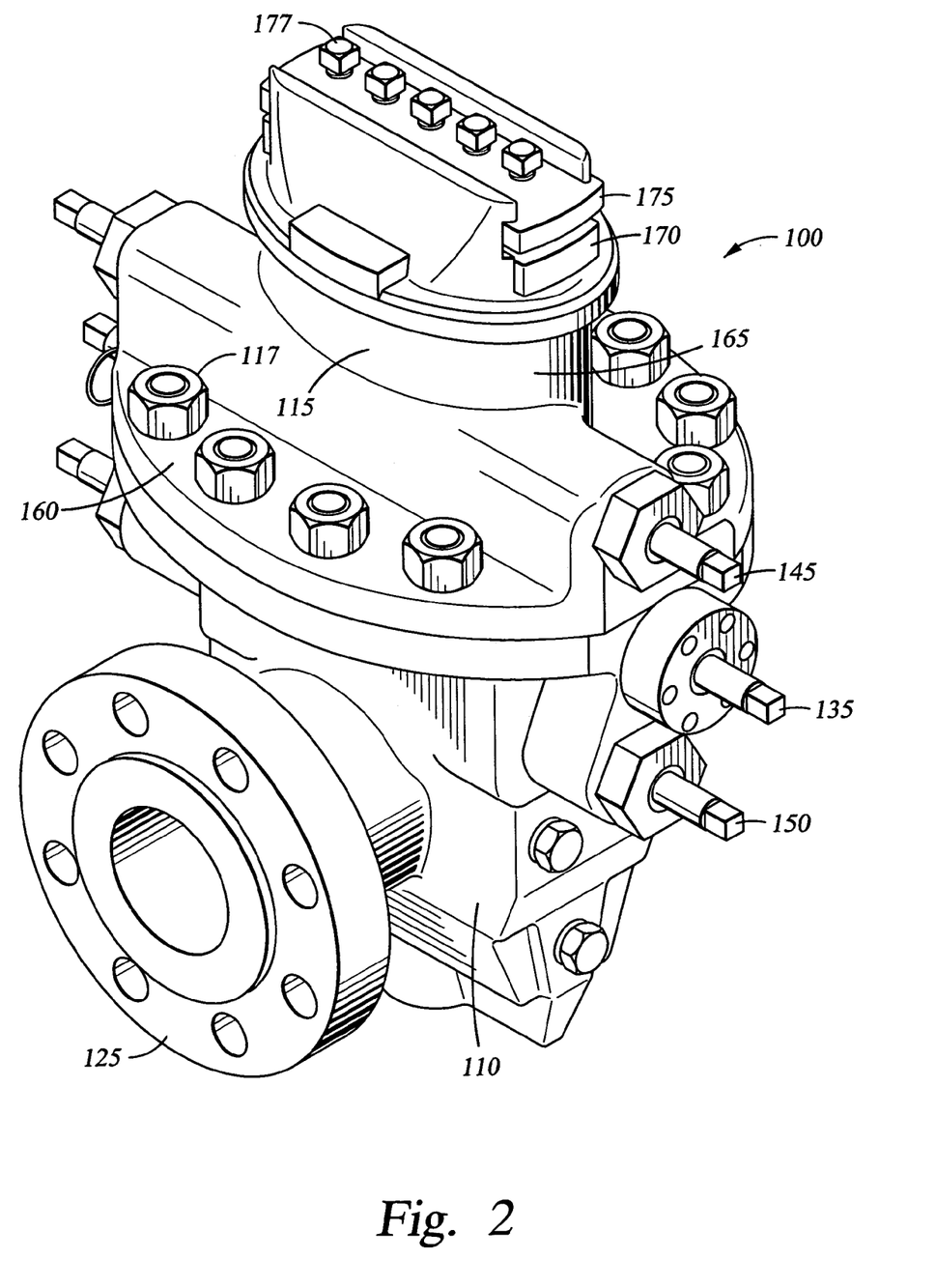
FIG. 2 is an isometric view of a dual chamber orifice fitting.
Figure 3:
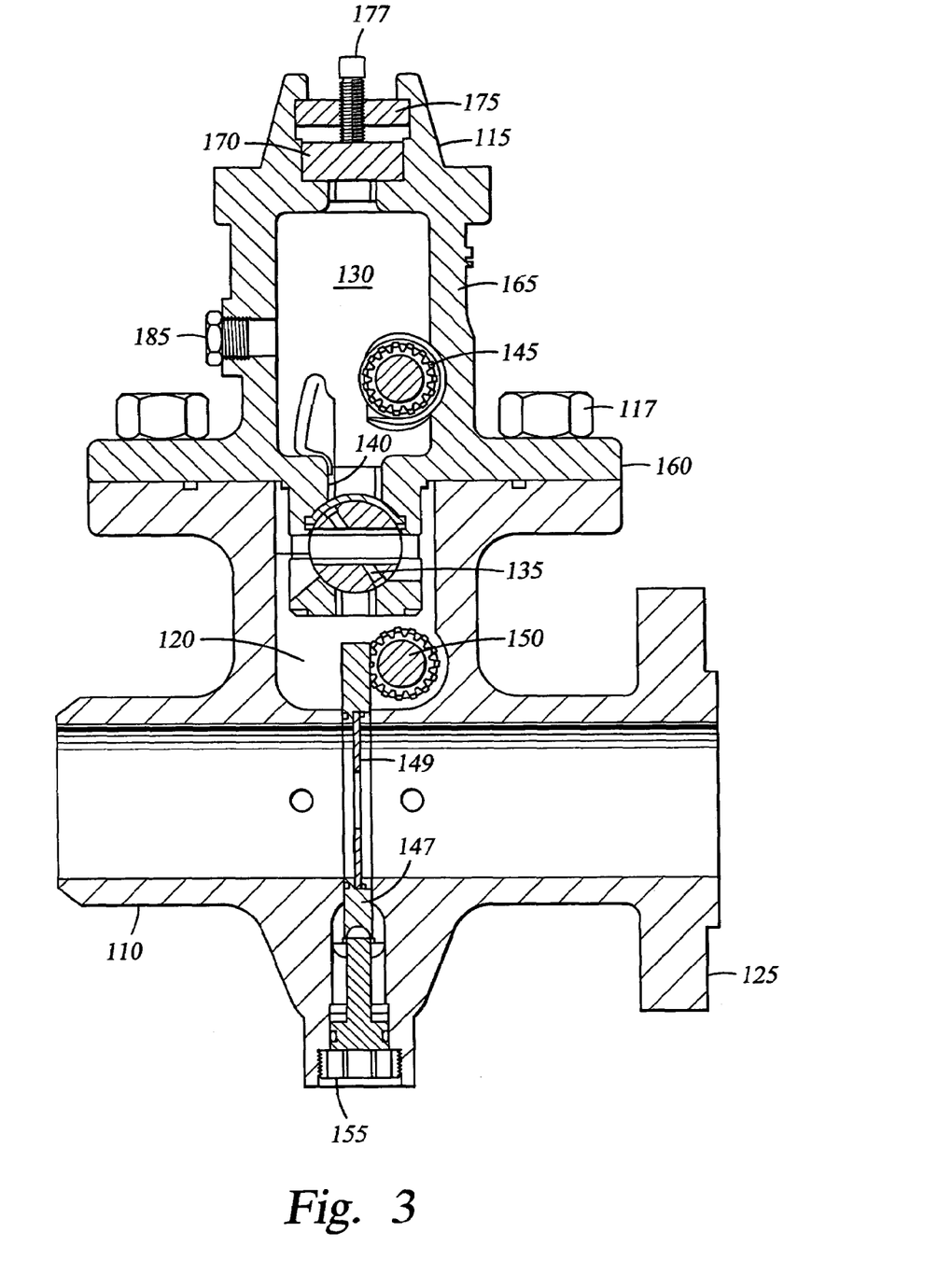
FIG. 3 is a cross-sectional elevation view of the fitting of FIG. 2.

Referring now to FIGS. 2 and 3, one embodiment of a dual chamber orifice fitting 100 is shown. Fitting 100 includes body 110 and top 115 connected by bolts 117. Body 110 encloses lower chamber 120 and provides fluid communication with the interior of the pipeline by way of flange 125. Plug 155 seals the lower end of body 110. Top 115 encloses upper chamber 130 and includes aperture 140, which provides a passageway between the upper chamber and lower chamber 120. Valve assembly 135 is used to open and close the aperture 140. One preferred valve assembly is described in U.S. patent application Ser. No. 10/848,978, entitled "Dual Chamber Orifice Fitting Valve," which is incorporated by reference herein for all purposes.

Orifice plate carrier 147 supports the orifice plate 149. Upper drive assembly 145 and lower drive assembly 150 are used to move orifice plate carrier 147 between lower chamber 120 and upper chamber 130. One preferred orifice plate carrier assembly is described in U.S. patent application Ser. No. 10/849,087, entitled "Dual Chamber Orifice Fitting Plate Support," which is hereby incorporated by reference herein for all purposes.

Figure 4:
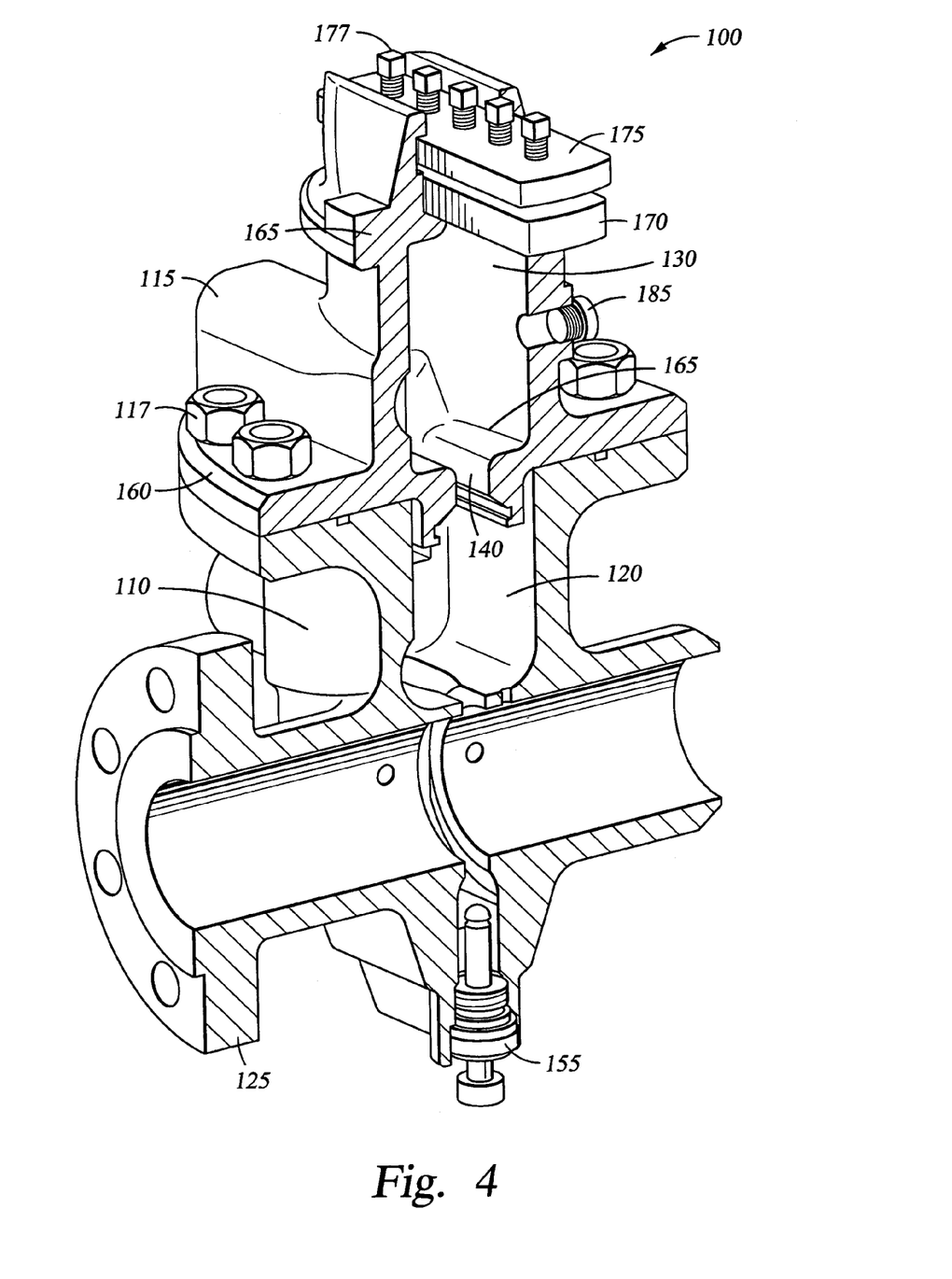
FIG. 4 is a partial sectional isometric view of the fitting of FIG. 2.
Figure 5:
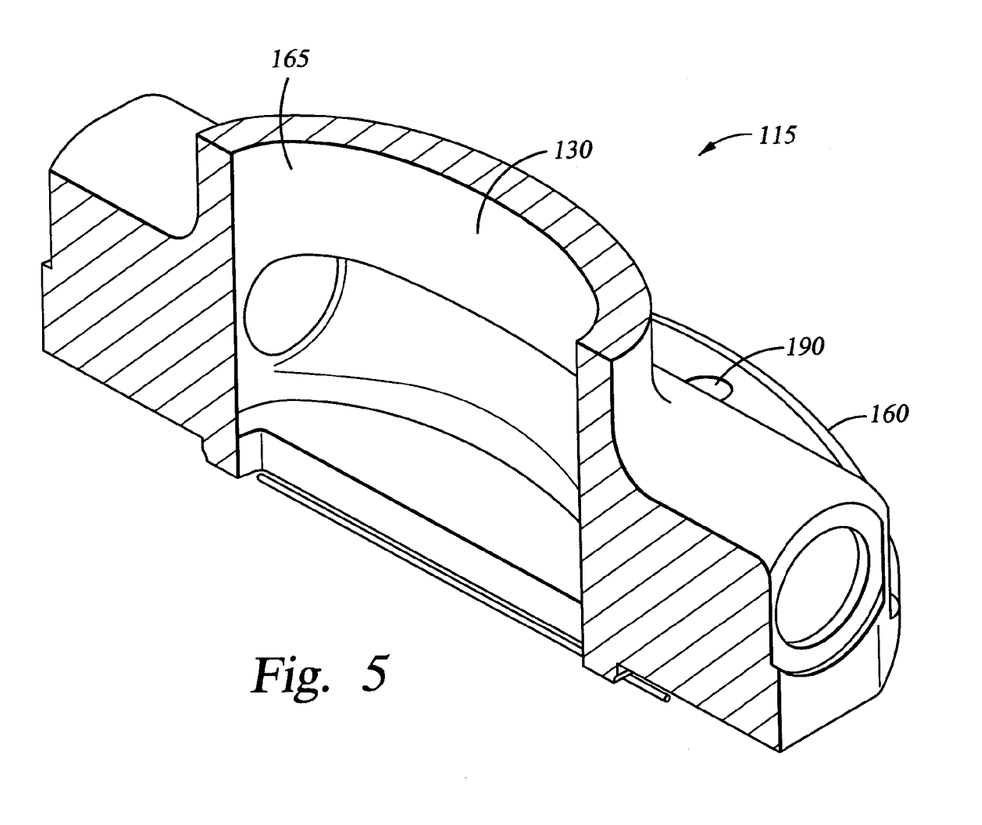
FIG. 5 is a partial sectional isometric view of the top of FIG. 2.

FIG. 4 shows an isometric cross-section view of fitting 100. The internal components have been removed so that the features of body 110 and top 115 can be seen. Top 115 includes upper chamber 130 with curved wall 165. Curved wall 165 gives upper chamber 130 a non-rectangular cross-section, a portion of which can be seen in FIG. 5. The exterior shape of wall 165 closely follows the shape of upper chamber 130 providing a substantially constant wall thickness surrounding the chamber. Wall 165 extends into flange 160 having bolt pattern 190. Bolt pattern 190 is spaced so as to allow access to bolts 117 attaching top 115 to body 110, which has a corresponding bolt pattern.

Figure 6:
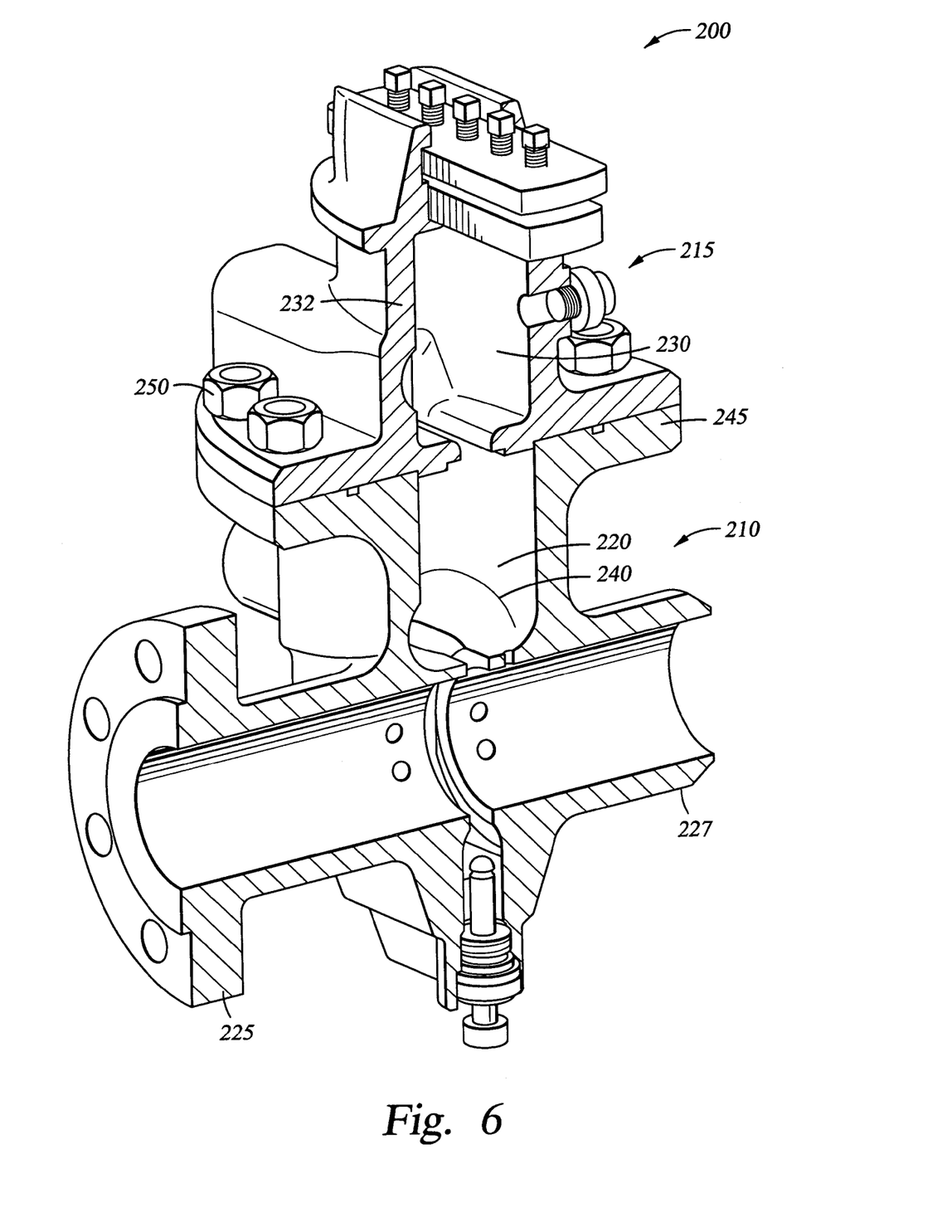
FIG. 6 is a partial sectional isometric view of an alternate embodiment of a dual chamber orifice fitting.
Figure 7:
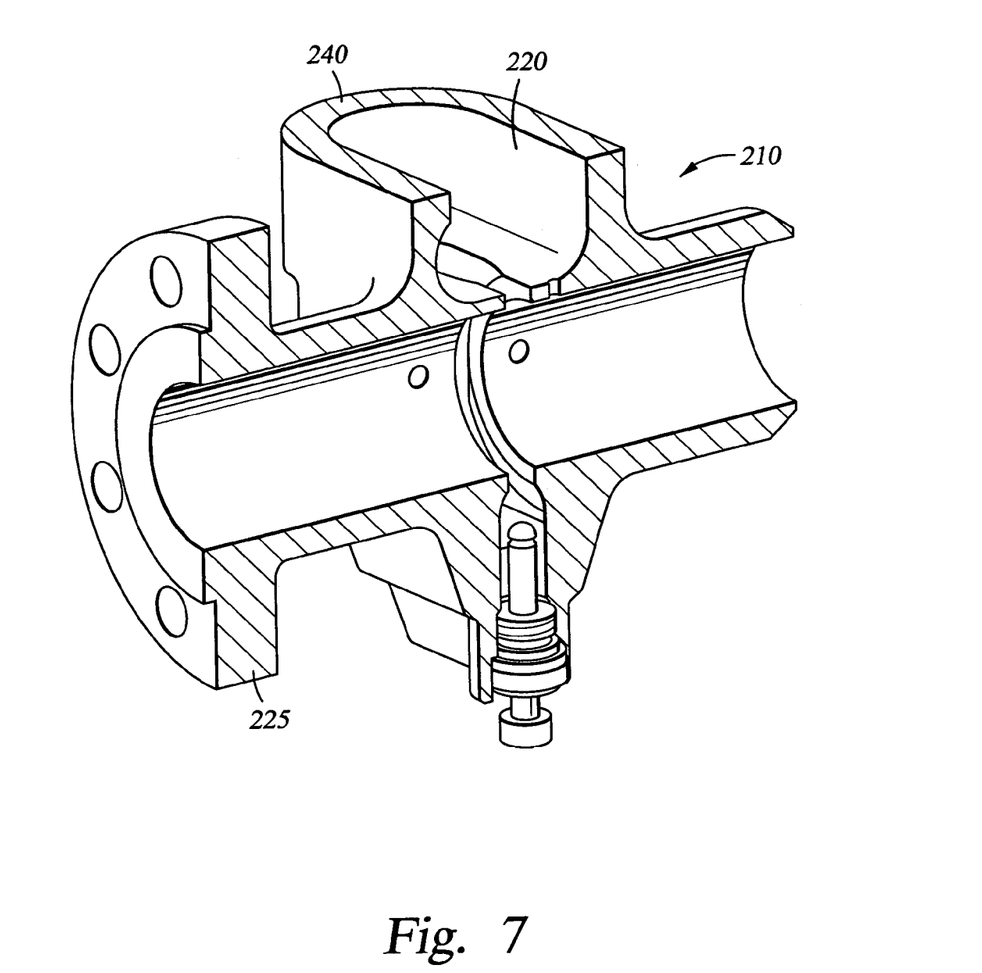
FIG. 7 is a partial sectional isometric view of the body of FIG. 6.

Referring now to FIG. 6, an alternate embodiment of fitting 200 is shown having a body 210 and top 215. Top 215 encloses upper chamber 230, which has a non-rectangular cross-section and curved wall 232 such as those described in reference to FIGS. 4 and 5. Body 210 includes lower chamber 220, which has a non-rectangular cross-section and a curved wall 240. Body 210 provides fluid communication with the interior of the pipeline by way of flange 225 and weld neck 227. Similar to body 110 described above, body 210 is adapted to support a lower drive mechanism (not shown) and valve assembly (not shown), but supports these components in a lower chamber 220 with a curved wall 240. Lower chamber 220 accommodates a standard rectangular orifice plate carrier but expands the size of the chamber to a shape having a curved cross-section, a portion of which is shown in FIG. 7. In some embodiments, the chamber has an elliptical cross-section. In the preferred embodiments, wall 240 has a substantially constant thickness, creating a body 210 that has a curved outer shape surrounding lower chamber 220.

Figure 8:
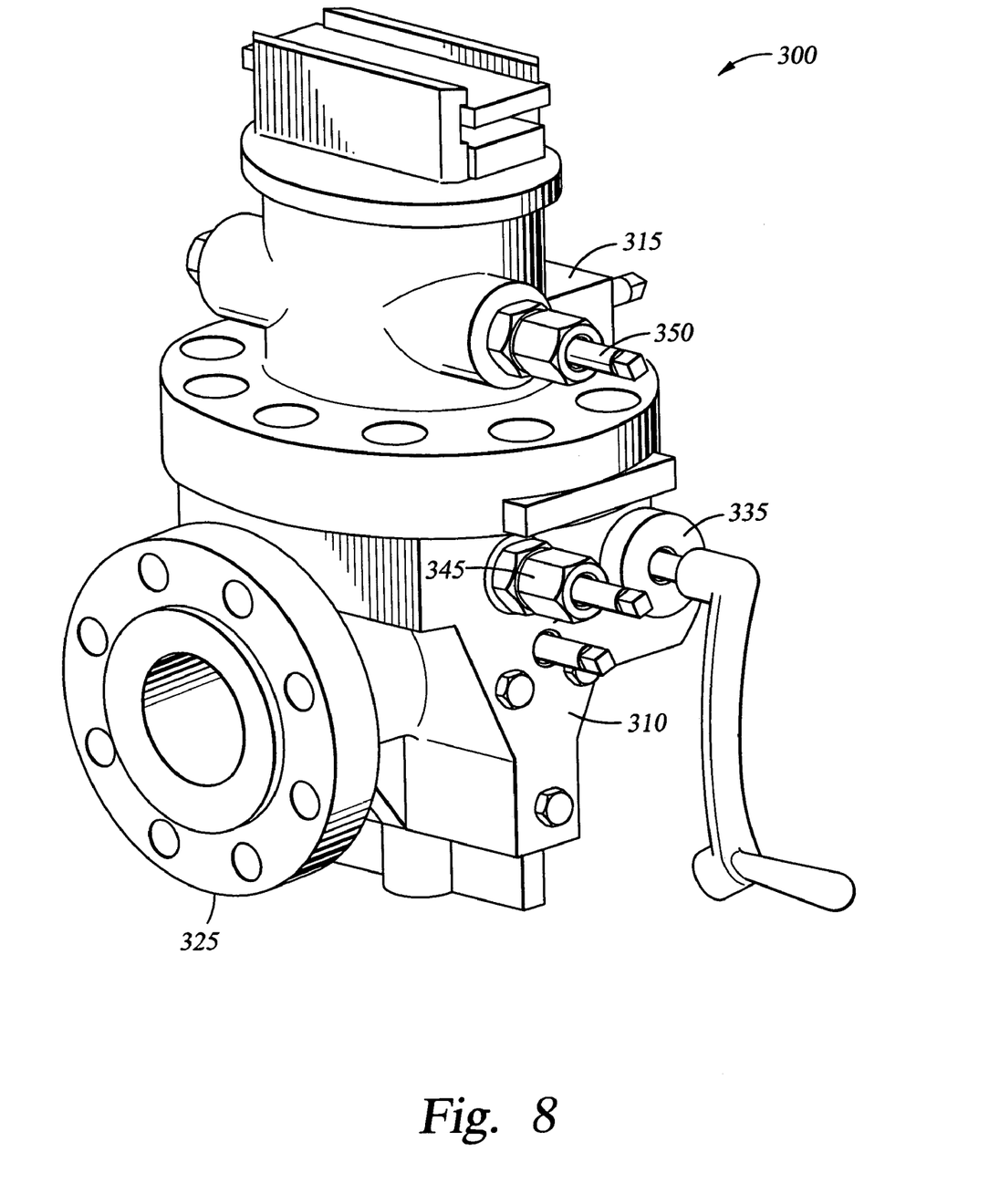
FIG. 8 is an isometric view of another alternate embodiment of a dual chamber orifice fitting.
Figure 9:
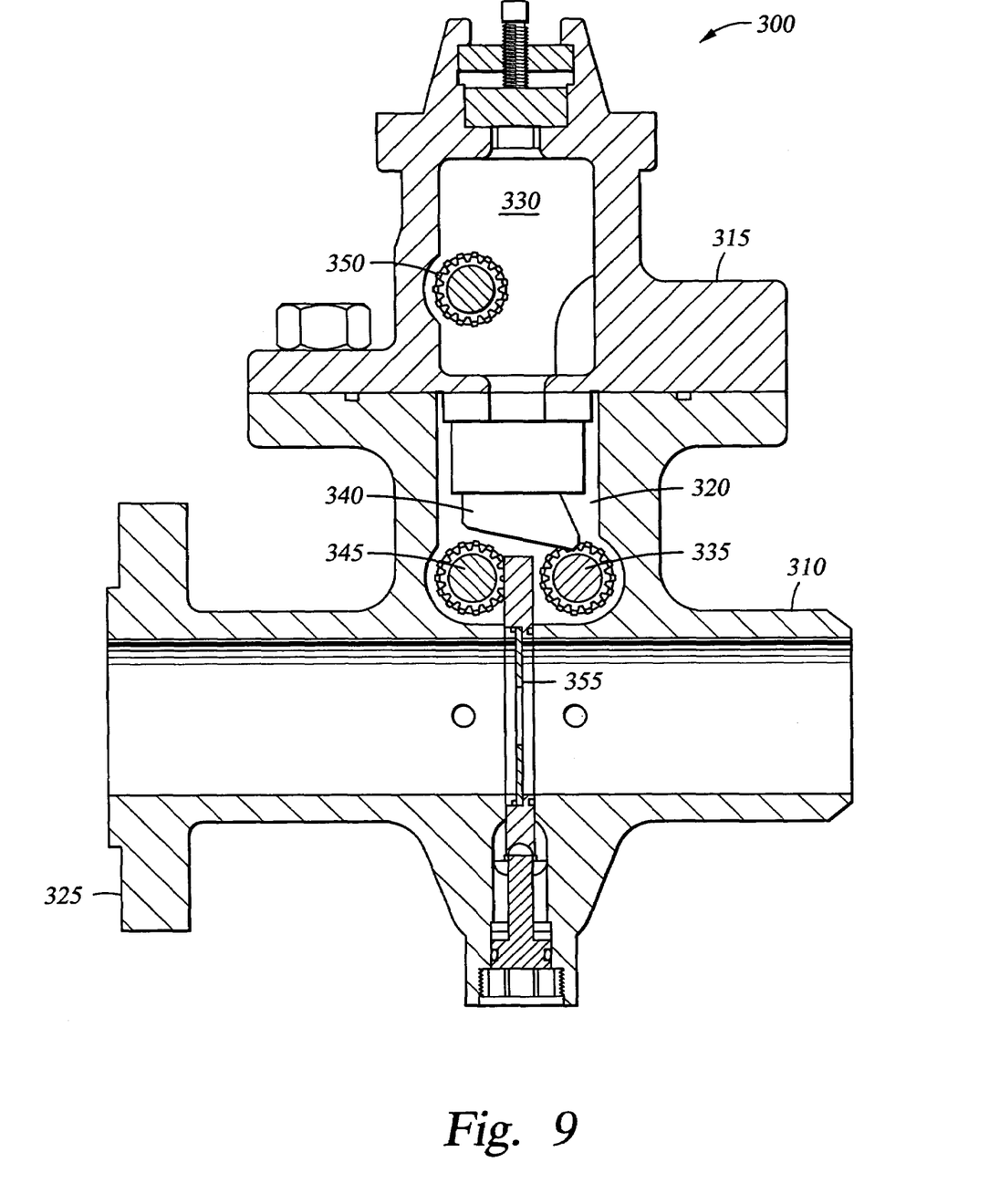
FIG. 9 is a cross-sectional elevation view of the fitting of FIG. 8.

Referring now to FIGS. 8 and 9, an alternate embodiment of a dual chamber orifice fitting 300 is shown. Fitting 300 includes body 310 and top 315. Body 310 encloses lower chamber 320 and provides fluid communication with the interior of the pipeline by way of flange 325. Top 315 encloses upper chamber 330. Shaft 335 is used to open and close a valve assembly 340 that isolates lower chamber 320 from upper chamber 330. Valve assembly 340 is a slide-type valve as is known in the art and actuates by moving laterally across an aperture. Shafts 345 and 350 are used to move orifice plate carrier 355 between lower chamber 320 and upper chamber 330. FIGS. 8 and 9 illustrate that fittings with curved chambers can be adapted to different styles of valve fittings including plug valves, slide valves, ball valves and other types of dual and single chamber orifice fittings.

The previously described embodiments include upper and lower chambers that have curved cross-sections. In certain embodiments, the cross-sections are elliptical. Other non-rectangular cross-sections, such as circles, oval, and variable radius curves, may also be used. It is also understood that the chambers may not have a consistent cross-section over their entire length. It may be desirable to vary the cross section of the chamber and/or wall in order to compensate for penetrations through the wall or to accommodate internal equipment.

One important aspect of the invention is the use of non-rectangular upper and/or lower chambers, which provides several benefits over convention rectangular cross-section chambers. The non-rectangular cross section of the chambers provide a more uniform stress distribution through the wall surrounding the chamber than would be possible with a rectangular cross-section. By effectively managing this stress distribution, acceptable stress levels can be maintained with a thinner wall structure. A thinner wall structure requires less material and the overall weight of the fitting can be reduced. A lighter fitting reduces the costs of procuring and manufacturing the fitting. The curved wall structure also minimizes deflection of the wall under pressurized conditions, which gives greater reliability and allows for closer tolerances between the chamber wall and the interior components.

The curved wall also allows the bolts that connect the flanges on the top and body components to be evenly spaced for easier access. Controlling the thickness of the wall allows for sufficient space to be provided around each bolt location to provide access to wrenches and other torque-applying tools.

The curved chamber also provides advantages in the manufacturing of the top and the body. Conventionally, the top and body are cast components. When being cast, an insert is used to form the chamber within the components. Because the conventional chamber has a relatively thin rectangular cross-section, the insert used to form the chamber is susceptible to warping or moving due to the intense heat of the casting process. This warping or moving caused inconsistent castings and added complexity to the manufacturing process. The larger curved cross-section chamber requires a larger insert to form and is thus less susceptible to casting defects.

The preferred embodiments relate to apparatus for housing a dual chamber orifice fitting but the concepts of the invention are susceptible to use in embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. In particular, various embodiments of the present invention provide a number of different body shapes and styles to improve stress distribution through the body. Reference is made to the application of the concepts of the present invention to dual chamber orifice fitting with a plug valve arrangement, but the use of the concepts of the present invention is not limited to these applications, and can be used for any other applications including other dual chamber fittings, including slide valve fittings, tapered valve fittings, ball valve fittings and other orifice fittings utilizing rectangular orifice plate carriers. It is to be fully recognized that the different teachings of the embodiments discussed below may be employed separately or in any suitable combination to produce desired results.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A fitting comprising:
    a body portion having a lower chamber in fluid communication with a pipeline;
    a top portion connected to said body portion via an upper flange that is coupled to a lower flange disposed on said body portion;
    an upper chamber disposed within said top portion and in fluid communication with the lower chamber, wherein at least a portion of either the upper chamber or the lower chamber has a non-rectangular cross section, wherein the cross section is taken parallel to the upper and lower flanges;
    a valve adapted to isolate the upper chamber from the lower chamber; and
    a plate having an orifice, wherein said plate is selectably disposable in either the upper or lower chamber.

2. The fitting of claim 1 wherein said plate has a first position where said plate is within the lower chamber and a second position wherein said plate is within the upper chamber.

3. The fitting of claim 2 wherein the orifice is aligned with the pipeline when said plate is in the first position.

4. The fitting of claim 1 wherein at least one plane parallel to the lower flange and through the lower chamber defines an elliptical cross-section.

5. The fitting of claim 1 wherein at least one plane parallel to the upper flange and through the upper chamber defines an elliptical cross-section.

6. The fitting of claim 1, wherein said upper and lower flanges have corresponding non-rectangular bolt patterns.

7. The fitting of claim 1 wherein the top portion further comprises a curved wall surrounding the upper chamber, wherein the curved wall is curved about an axis that is perpendicular to the upper flange.

8. The fitting of claim 7 wherein the curved wall has an inner and outer curved surface.

9. The fitting of claim 1 wherein the body portion further comprises a curved wall surrounding the lower chamber, wherein the curved wall is curved about an axis that is perpendicular to the lower flange.

10. The fitting of claim 9 wherein the curved wall has an inner and outer curved surface.

11. A dual chamber orifice fitting comprising:
    a body portion having a lower chamber in fluid communication with a pipeline; and
    a top portion having an upper chamber in fluid communication with the lower chamber,
    an upper flange disposed on said top portion and coupled to a lower flange disposed on said body portion;
    wherein at least a portion of either the upper chamber or the lower chamber has a cross-section with an inner radius that is variable relative to the center of the fitting, wherein the cross section is taken parallel to the upper and lower flanges.

12. The fitting of claim 11 further comprising an orifice plate carrier selectably disposable in either the lower chamber or the upper chamber, wherein said orifice plate carrier has a rectangular cross-section.

13. The fitting of claim 11 wherein a portion of the upper chamber has a cross section with a variable inner radius relative to the center of the fitting, wherein the cross section is taken parallel to the upper flange.

14. The fitting of claim 13 further comprising a wall having a substantially constant thickness surrounding the portion of the upper chamber having a cross section with a variable inner radius from the center of the fitting.

15. The fitting of claim 13 wherein a portion of the upper chamber has a cross section with an elliptical cross-section, wherein the cross section is taken parallel to the upper flange.

16. The fitting of claim 11 wherein a portion of the lower chamber has a cross section with an elliptical cross-section, wherein the cross section is taken parallel to the lower flange.

17. The fitting of claim 16 further comprising a wall having a substantially constant thickness surrounding the portion of the lower chamber having a cross section with a variable inner radius from the center of the fitting.

18. The fitting of claim 16 wherein a portion of the lower chamber has a cross section with an elliptical cross-section, wherein the cross section is taken parallel to the lower flange.

19. The fitting of claim 11, wherein said upper and lower flanges have corresponding non-rectangular bolt patterns.

20. A fitting comprising:
a body portion having a lower chamber in fluid communication with a pipeline;
a top portion connected to said body portion via an upper flange that is coupled to a lower flange disposed on said body portion;
an upper chamber disposed within said top portion and in fluid communication with the lower chamber, wherein at least a portion of both the upper and lower chambers have non-rectangular cross sections, wherein the cross sections are taken parallel to the upper and lower flanges;
a valve adapted to isolate the upper chamber from the lower chamber; and
a plate having an orifice, wherein said plate is selectably disposable in either the upper or lower chamber.

21. The fitting of claim 20 wherein said plate has a first position where said plate is within the lower chamber and a second position wherein said plate is within the upper chamber.

22. The fitting of claim 20 wherein the upper chamber has an elliptical cross-section.

23. The fitting of claim 20 wherein the lower chamber has an elliptical cross-section.

24. The fitting of claim 20, wherein said upper and lower flanges have corresponding non-rectangular bolt patterns.

25. The fitting of claim 20 further comprising:
a curved wall surrounding the upper chamber; and
a curved wall surrounding the lower chamber.

26. The fitting of claim 25 wherein the curved walls have inner and outer curved surfaces.

* * * * *